Figure 2A:
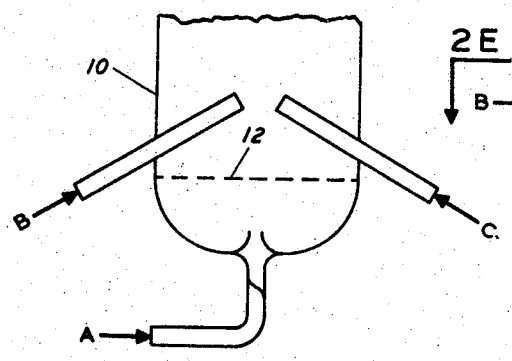

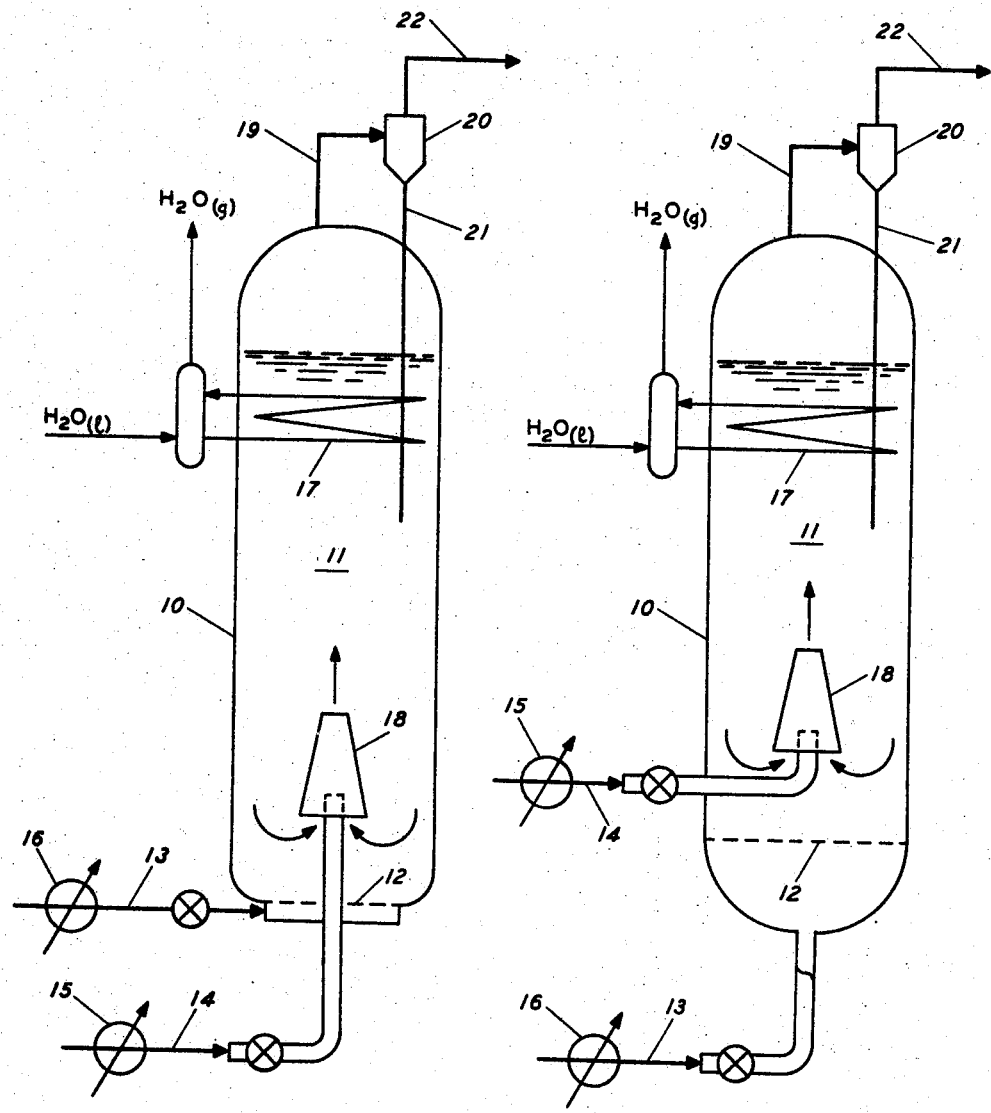

Nov. 7, 1967  J. R. B. ELLIS ET AL  3,351,634
METHOD OF CARRYING OUT EXOTHERMIC VAPOR
PHASE CHEMICAL REACTIONS
Filed July 15, 1963  2 Sheets-Sheet 2

INVENTORS
JOHN R. B. ELLIS
MACK F. HUGHES

United States Patent Office 3,351,634
Patented Nov. 7, 1967

3,351,634
METHOD OF CARRYING OUT EXOTHERMIC VAPOR PHASE CHEMICAL REACTIONS
John R. B. Ellis, Kentfield, and Mack F. Hughes, Albany, Calif., assignors to Chevron Research Company, a corporation of Delaware
Filed July 15, 1963, Ser. No. 294,838
6 Claims. (Cl. 260—346.4)

This invention relates to an improved method for partially oxidizing organic compounds in the vapor state by generating a local oxidizing condition in the dense phase of a fluid bed otherwise operating under reaction-quenching conditions. In one specific aspect thereof, this invention relates to a new and improved fluid-bed process for the vapor-phase catalyzed oxidation of o-xylene to phathalic anhydride.

Fluidized ebullient solid-bed reaction systems are well known for the excellence of their temperature control characteristics. Temperature control in the vapor-phase oxidation art is and has been a particular source of difficulty in that these reactions are highly exothermic and frequently subject to runaway reactions, over-oxidation, and the acceptance of undesirable limitations in order to avoid the foregoing problems. Inherently satisfactory fluid-bed operation in the past has meant the acceptance of contact times of the order of 1 second and higher, and usually of the order of 5 to 30 seconds. Under these conditions, oxidizable vaporized organic compounds are usually found to be over-oxidized, resulting in inferior yields and in the conversion of costly feed materials, in large part, to useless carbon dioxide.

It has been found that selective partial oxidation may be effected in the dense phase of a suspended catalyst bed maintained in an ebullient and suspended form by an oxidizing gas and provided with cooling means in contact with said dense phase, to maintain the bulk of the fluid-bed catalyst at a controlled temperature below the effective reaction temperature of the desired oxidation reaction. The organic feed to be oxidized is preheated to oxidation initiating reaction temperatures and introduced directly into the dense phase of the fluid catalyst bed and thereby into contact with the oxidizing gas and catalyst. The desired oxidation reaction is effected within a restricted reaction zone and promptly quenched by the differential temperature of surrounding catalyst phase with the resultant oxidation products passing downstream and being disengaged from the catalyst bed and recovered from the effluent vapors.

In a more particular form of the process, vaporized oxidizable organic compounds are efficiently converted to corresponding partially oxidized products by (1) heating by a suitable means the dense phase of a fluid-bed reaction system to a temperature $T_1$ defined by the expression:

$$T_1 = T_2 - Y$$

in which $T_2$ is the fluid-bed temperature at which incipient partial oxidation occurs, and not more than about a 10% conversion, when a gaseous mixture consisting of the oxidizable organic compound and air having a mol ratio of organic compound to oxygen of about 1:3 is introduced at $T_2$ into the fluid bed at a linear velocity of 2 ft./sec., in which Y is a temperature differential in degrees Fahrenheit in the range from about 100–400, in which the fluidized solid may be a vapor-phase oxidation catalyst, inert solid, or mixture of inert and catalytic solids, and wherein the temperature, $T_1$, is maintained in the fluid bed by a suitable indirect heat exchanger in contact with a portion of the fluidized bed dense phase; (2) thereafter separately introducing into the fluidized-solid dense phase the vaporized oxidizable organic compound and at least one molecular oxygen-containing gas stream wherein at least one of the intromittent gas streams is introduced at a temperature in the range of from about 150–500° F. higher than the temperature $T_2$ of the foregoing expression, thereby locally generating within the zone of initial common contacting of the compound, oxygen-containing gas, and fluidized solid, a local oxidizing condition; and (3) from the resulting reaction-product containing gas stream recovering the corresponding partially oxidized oxidizable organic compound. A feature of the process is the accomplishment of partial oxidation in the foregoing manner with fluid bed contact times at oxidizing temperature being of the order of 0.01 second and shorter in fluidized-solid beds having depth of the order of from 3 to 30 feet.

By incipient partial oxidation temperature is meant one in which for a given fluid-bed reaction system, feed, catalyst or inert solid, at least about 0.1, but less than about 10, percent of the feed is converted to the corresponding partially oxidized feed as the product. In general, the temperature $T_2$, corresponding to conversions within the above range, in its application in the above-defined formula, $T_1 = T_2 - Y$, will establish a fluid-bed operating temperature, $T_1$, which is reaction quenching.

In the process, the introduction of the molecular oxygen-containing gas and of the vaporized oxidation feed must be separately made into the fluid-bed dense phase in such a manner that effective and substantially immediate localized heat energy exchange occurs between the reaction components, feed, fluidized catalyst, and molecular oxygen. In this exchange, there is momentarily induced locally in the fluid bed an oxidizing temperature condition which is of short duration because the fluid bed, except for the localized transient condition, is maintained at a reaction-quenching temperature. In order to generate the oxidizing condition, usually the vaporized organic feed, or this feed diluted with an inert carrier gas, is preheated to a temperature sufficiently superior to the general fluid bed temperature to generate the local oxidizing temperature in the bed. An alternative mode, where the feed is temperature sensitive is to preheat a gas stream, other than the oxidizable feed, such as the oxygen-containing gas.

In general, and for efficient operation, the above considerations presuppose the use of in-bed gas distribution systems, such as grid-type distributors, multiple-nozzle distributors, and with external headers, single and multiple injection nozzles with and without headers, and in-bed impinging jet streams. In order to maintain superheat gas injection temperatures and to minimize premature heat transfer to the fluid bed, suitable insulating means are employed, including materials of construction, such as low heat transfer ceramics, jacketing, and the like.

Figure 2D:
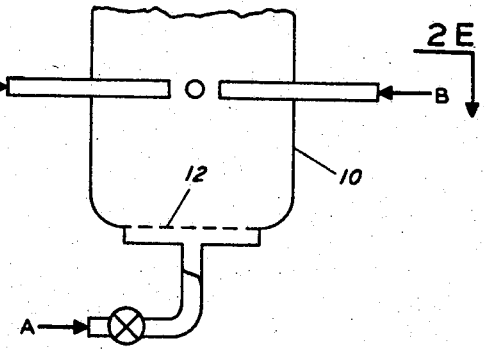
Figure 2B:
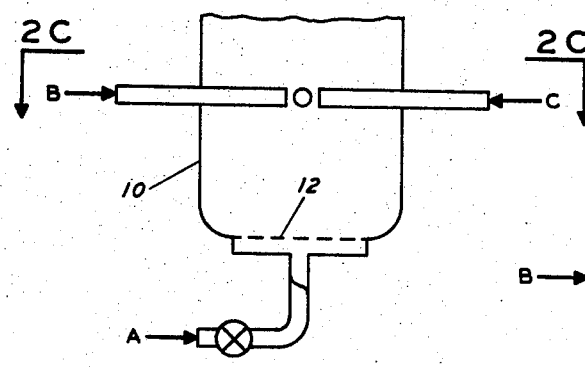
Figure 2E:
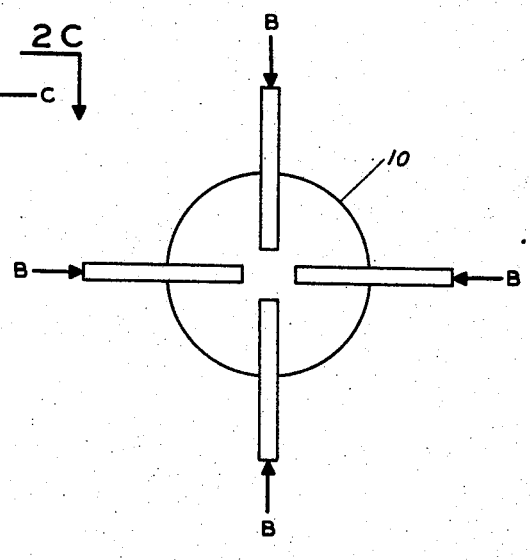
Figure 2C:
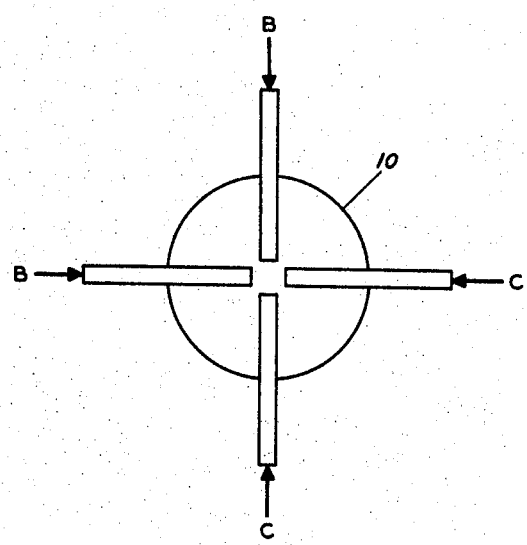

Representative injection systems are shown in FIGS. 2A–2E inclusive, in which lines marked A are employed for the introduction of the fluidizing gas medium, usually air or an inert gas, lines B are for the introduction of vaporized feed, and lines C are for the introduction of air, oxygen, or the like. Thus FIG. 2A represents basal admission of fluidizing gas and lateral admission of separate feed and oxidizing gas streams directed to impinge in the fluid bed. FIG. 2B and FIG. 2C represent peripheral admission of multiple impinging feed and oxidizing gas streams. FIGS. 2D and 2E represent peripheral admission of multiple feed lines with the oxidizing gas stream being wholly supplied by the fluidizing gas.

In addition to the fluidized bed and the separate gaseous feed distribution elements, the process requires an efficient heat exchange means in contact with the dense phase (also known as the continuous phase) of the ebullient bed. Such means must be an indirect heat exchanger capable of maintaining the desired subreaction temperature in the majority of the bed, must not interfere particularly with the ebulliation of the fluid bed, and depending upon the specific reaction system employed will vary in distance from the localized oxidation zone from 1 to 6 feet and even further.

Above the fluidized bed desirably is left a free space to facilitate disengagement of the product-containing gas stream from the solid bed. A cyclone or filter for the entrapment and return of fine solids contained in the gas stream to the fluid bed proper is also desirable. Other auxiliary elements can include a means to remove and add portions of the fluidized solid, such as for renewal, catalyst regeneration, or other appropriate treatments.

In general, the incipient oxidation temperature, $T_2$, of the above formula will vary depending upon the nature of the particular feed material, being higher for oxidation-resistant materials, such as methane, benzene, and the like, and lower for oxidation-sensitive materials, such as formaldehyde, benzaldehyde, and the like. Where an oxidation catalyst is employed, the greater the catalyst activity in general, the lower will be the value of $T_2$. In most events, $T_2$ will be a temperature in the range from about 212°–1000° F.

The temperature differential, Y, which is desirably used to establish the fluidized-solid bed operating temperature for a given process feed and its resulting product, varies. It must be at least about 100° F. in order that the resulting temperature, $T_1$, be a reaction-quenching temperature. It must not be so large that it establishes a temperature, $T_1$, which is less than the dew point of the reaction product mixture. In general, Y will be in the range from about 100° F. to about 400° F.

Molecular oxygen to oxidation feed compound mole ratios useful in the process will approximate those in known vapor phase oxidations. In addition, many mole ratio ranges inoperable in the prior art or avoided because of explosive hazards can be safely and efficiently employed. Thus, oxidations can now be accomplished in the present process at higher temperatures, shorter contact times, and lower oxygen to feed mole ratios than formerly possible or practicable. In general, mole ratios of oxygen to feed compound in the range from about 0.1–100:1 may be employed. Preferably, ratios are in the range 0.5–20:1.

As feed stocks for the process, all partially oxidizable organic compounds are contemplated which are capable of being vaporized without accompanying thermal degradation of any substantial degree, for example less than about 10%, if at all. The ability of the feed compound to withstand vaporizing temperatures or superheating in the vapor state essentially intact need only be for, at most, a few seconds duration. In general, suitable and preferred process feed compounds will have boiling points at one atmosphere pressure below about 1,000° F. and will contain from 1 to about 25 carbon atoms per molecule. In addition to hydrogen, these compounds may or may not contain one or more atoms of oxygen, nitrogen, sulfur, and halogen, either singly or in combination. Hydrocarbon feeds are particularly preferred and, in general, all hydrocarbons, including mixtures which are substantially thermally stable under vaporizing temperature conditions, are contemplated for the process. Thus, alkanes, alkenes, cycloalkanes, cycloalkenes, mononuclear and polynuclear aromatic hydrocarbons and their alkyl-, aryl-, and alkylaryl-substituted derivatives are included, such as methane, ethane, propane, pentanes, decanes, eicosanes, ethene, propene, butene-1, butene-2, isobutene, dodecene-1, dodecene-2, dodecene-3, etc., cyclohexane, cyclohexene, cyclooctane, cyclooctene, cyclododecane, cyclododecene, cyclododecadienes, cyclooctadiene-1,5-benzene, toluene, xylenes (o, m, and p), cumene, naphthalene, ethylbenzene, α-methylnaphthalene, as well as higher alkylbenzenes, naphthalenes, biphenyls, anthracenes, phenanthracenes and the like.

Particularly preferred among the hydrocarbon feeds are the aromatic hydrocarbons known to yield carboxylic acids and anhydrides when oxidized in the vapor state. Examples of this type of feed are benzene, naphthalene, o-xylene, toluene, and the like. Representative products resulting from the use of such preferred aromatic hydrocarbon feeds are maleic anhydride, phthalic anhydride, benzoic acid, and the like.

Other suitable feeds for the process include alcohols, such as methyl, benzyl, naphthyl, and n-butyl, cyclohexanol, octanol-1, cyclooctanol, and so forth; ethers, such as ethyl, propyl, butyl; carboxylic acids, such as o-toluic, m-toluic, and p-toluic, that is, lower alkyl-substituted benzoic and naphthalic acids, as well as their liquid-phase partial oxidation product mixtures and the like.

In general, the reaction products obtained will be the same in the present process as are obtained in the known vapor phase fixed bed and conventional fluid-bed reaction systems. Representative types are carboxylic acids, carboxylic acid anhydrides, alkylene oxides, ketones, alcohols, aldehydes, and the like, that is products corresponding in general to the feed compound, but in which at least one carbon-hydrogen bond has been converted to a carbon-oxygen bond, but not all of the carbon-hydrogen bonds are so transformed.

As catalyst for the process, all known solid vapor-phase oxidation catalysts are contemplated in the form of fluidized solids. In particular, the metal oxides of vanadium, chromium, manganese, mixtures of the foregoing, silver, and their modifications as known in the vapor-phase oxidation art are contemplated. These catalytic materials may be employed per se or as supported upon inert materials, such as alumina, silica, silicon carbide, and the like, when sized to fluid-bed operating requirements, that is in graded sizes within the range from about 1 to 1000 microns, preferably from 10–500 microns and more desirably from about 10–100 microns, with minor portions being in the range 10–20 and 80–100, and the major portion being in the range 20–80 micron particle sizes.

In the form of microspheres, the fluidized catalysts are particularly effective.

The invention will be more clearly understood from the following detailed description read in conjunction with the accompanying drawings, wherein FIGS. 1A–1B illustrate in schematic form one method for carrying out the invention, and FIGS. 2A–2E exemplify additional forms of reactor feed injector representations.

In the following description, the process is described in use for the production of phthalic anhydride from o-xylene. The catalyst is a fused vanadium oxide initially in the form of $V_2O_5$ microspheres, which in use reach a somewhat lower oxidation state. It is to be understood that this invention is not limited to any particular catalyst composition, to any particular feed, or to any particular type of apparatus.

Referring, therefore, to FIG. 1, there is provided a reactor which is an essentially vertical chamber 10 capable of containing at elevated temperatures an operating ebullient fluidized-solid bed having a diameter in the range from about 2 inches up to 10 feet and larger, and having a vertical height of from about 3 to 30 feet, plus about 10% of the expanded fluid-bed depth for free space above the bed, containing the bed of fluidized solids 11, as well as a base grid 12, connecting inlet gas stream headers 13 and 14, inlet line appurtenant elements, such as temperature control elements 15 and 16, a fluid bed temperature control means 17 located in the continuous fluid-bed phase, a reaction zone holder 18, an exit header 19, a cyclone 20 for the disengagement of catalyst fines from the effluent gas stream, a line to return the thus recovered fines to the reaction zone proper 21, and an exit header line 22 for the delivery of the reaction product-containing gas stream to the product recovery facility. While the heat exchange means 17 is shown as a steam generator coil located in the downstream portion of the fluid bed, other equivalent heat exchange means may be employed to maintain the general fluid bed temperature, $T_1$, and said exchanger(s) can be located in closer approximation to the reaction zone holder, so long as the exchanger does not seriously interfere with the generation of the local oxidizing conditions and with the maintenance of the fluid bed in a normal fluid bed operating condition. While the reaction zone holder 18 is indicated as being a truncated cone with the inferior base as the exit port for the reaction product mixture, said holder may also be a section of pipe, may be in the form of a Venturi nozzle, or an open-ended box or the like. Advantageously, the reaction zone holder is constructed of materials having a relatively low heat transfer ability, for example of a ceramic material, and similarly the inlet header lines which permit the introduction of superheated gas streams are preferably constructed of materials having low heat transfer ability or are adequately insulated. While FIG. 1 shows but a single inlet header and reaction zone holder, it is not intended that this invention be so limited, because a plurality of these units may be used, depending upon the relative size of the units and of the fluid bed. Similarly, as shown in FIGS. 1A and 1B, the inlet header(s) may be positioned basally, laterally, and the like, relative to the ebulliating fluid-bed, so long as such header positioning, together with the associated reaction zone holder elements, does not prevent stable fluid-bed operation.

Moreover, as further shown in FIGS. 2A-2E, applicants' invention contemplates, in accordance with the inventive principle, the use of feed injection systems capable of separately introducing an oxidation feed and molecular oxygen-containing gas into contact in the dense fluid-bed phase, thereby generating a local oxidizing condition within the fluid bed, which is otherwise maintained at a reaction-quenching temperature.

In the operation of the oxidizer unit, as shown in FIG. 1, the fluidized-solid catalyst 11 is introduced into reaction vessel 10 and air or an oxygen-containing gas stream is passed into the reactor through line 13, thereby to establish the fluidized-solid reaction bed. For this purpose, the linear rate of gas flow through the reactor for satisfactory ebulliating fluid-bed operation will be in the range 0.5 to 3.5 feet per second. The desired reaction bed temperature, $T_1$, is maintained in the fluidized-solid bed by means of the heat exchanger 17 or of the preheat unit 16 or of a combination of these two. In a typical o-xylene oxidation for the production of phthalic anhydride and on the basic of 1,000 pounds per hour of o-xylene feed, the reactor is charged with 14,000 pounds of $V_2O_5$ microspheres of about 40-75 micron size to provide a fluidized-bed depth of 12 to 15 feet. Air initially at 600-800° F. is passed into the base of the reactor through line 13 at a rate of 10,000 to 14,000 pounds per hour, but after the reaction has started, the air need not be heated and is conveniently introduced at its ambient temperature. o-Xylene is then passed into the vaporizer-superheater 15, along with 500-1500, preferably about 1000 pounds per hour of inert gas, such as steam. In the vaporizer, the o-xylene, together with the inert gas or stream is heated to a temperature of 1000-1300° F., preferably 1100-1200° F., and then passed into the reactor through line 14. The vaporized and superheated stream upon passing through the discharge end of line 14 entrains and mixes with the fluidized mixture of air and solid catalyst. Momentarily a local oxidizing condition is generated as the result of the admixture, and the condition is terminated not later than the time of passage of the reaction product-generating stream from the exit port of the reaction zone holder. The duration of the generated oxidizing condition is controlled within operational limits by the length of the reaction zone holder and the velocity of the entering gas stream via line 14. While the net linear velocity of the gas stream through the fluid bed for stable bed operation cannot exceed about 3.0 feet per second, the velocity of the entering high temperature gas stream may substantially exceed 3.0 feet per second and may be as much as 50 or even 500 feet per second, so long as the net linear velocity through the reactor is no greater than about 3.5 feet per second.

The reaction product-containing gas stream after leaving the reaction zone holder 18 passes through the balance of the fluid bed, which is maintained by exchanger 17 at an average bulk catalyst temperature in the range 400-800° F., preferably from 700-800° F., when oxidizing o-xylene feed, disengaging from the fluid bed in the void zone in the upper portion of the reactor, thereafter passing into a cyclone 20 or the equivalent, and exits via line 22 for delivery to the product recovery section.

While one specific process embodying the novel steps of the present invention, as well as one specific apparatus and a modified form of the apparatus for carrying out the same, has been described in detail, it is to be understood that this description is illustrative only and for the purpose of making the invention more clear, and it is not the intent that the invention shall be construed as limited to details of the description, except insofar as such limitations have been included in the terms of the following claims.

We claim:
1. Process for the partial oxidation of a vaporizable and oxidizable organic feed selected from the group consisting of hydrocarbons containing from 1 to 25 carbon atoms per molecule and having a boiling point at one atmosphere pressure below 1000° F. which comprises:
   (a) maintaining in an ebullient fluid-bed zone a variable valent heavy metal oxide vapor phase fluid-bed oxidation catalyst;
   (b) maintaining said zone at a temperature in the range from about 212° F. to 1000° F. and below the vapor phase oxidation temperature of said feed by indirect heat exchange means located in a portion of the continuous phase of said fluid-bed; and
   (c) separately introducing as vapors said feed and an oxygen-containing gas into a separate portion of said continuous phase and into mutual contact substantially simultaneously with said introduction wherein at least one of said intromittents is at a temperature substantially above the vapor phase oxidation temperature of said feed, thereby generating upon said mutual contacting for a period less than about 0.5 second a local oxidation reaction and partially oxidizing said feed.

2. In a process for the partial oxidation of a vaporizable and oxidizable organic feed in an ebullient fluid-bed zone at a temperature in the range 212-1000° F. containing at least one fluidized solid selected from the group consisting of vapor phase oxidation catalysts, inert solids or their mixtures, said feed being selected from the group consisting of hydrocarbons containing from 1 to 25 carbon atoms per molecule and having a boiling point at one atmosphere pressure below 1000° F., the improvement which comprises:
   (a) maintaining said zone at a quenching temperature $T_1$ below the vapor phase oxidation temperature of said feed by indirect heat exchange means located in a portion of the continuous phase of said fluid-bed; said temperature $T_1$ being defined by the expression:

$$T_1 = T_2 - Y$$

wherein $T_2$ is the fluid-bed temperature at which about a 10% conversion to partial oxidation product occurs when a gaseous mixture of said feed and air having a mole ratio of feed to oxygen of 3:1 is introduced at $T_2$ into said fluid bed, and wherein $Y$ is a temperature differential in degrees Fahrenheit in the range 100-400;
   (b) separately introducing as vapors said feed and an oxygen-containing gas into a separate portion of said continuous phase and into mutual contact substantially simultaneously with said introduction, wherein at least one of said intromittents is at a temperature in the range from about 150 to 500° F. higher than said temperature $T_2$; and thereby generating upon said mutual contacting for a period less than about 0.5 second a local oxidation reaction and partially oxidizing said feed.

3. Process of claim 2 wherein said oxidizable organic feed is selected from the group consisting of benzene, o-xylene, naphthalene and toluene.

4. A selective vapor-phase partial oxidation of o-xylene which comprises:
  (a) maintaining a fluid-bed zone containing a vanadium oxide vapor-phase fluid-bed oxidation catalyst in ebullient form at an average bulk catalyst temperature in the range 400–800° F.;
  (b) superheating said o-xylene to a temperature in the range 1000–1300° F.;
  (c) separately introducing said superheated o-xylene and air in a weight ratio in the range of 1:10–14, respectively, into mutual contact substantially simultaneously with said introduction within the dense phase of said fluid-bed catalyst zone;
  and recovering the resulting phthalic anhydride-containing reaction product mixture.

5. The process of claim 4 wherein said o-xylene is diluted with an inert gas.

6. The process of claim 4 wherein ambient air is used as the oxidizing and fluidizing means.

References Cited
UNITED STATES PATENTS

| | | | |
|---|---|---|---|
| 3,129,230 | 4/1964 | Hughes | 260—246.4 |
| 3,178,452 | 4/1965 | Smith et al. | 260—346.4 |

NICHOLAS S. RIZZO, *Primary Examiner.*